United States Patent [19]

Ichiki et al.

[11] 3,766,035

[45] Oct. 16, 1973

[54] METHOD OF SEPARATING METALS FROM WASTE WATER

[75] Inventors: Minoru Ichiki; Masahito Ishii, both of Tokyo, Japan

[73] Assignee: Mitsui Mining & Smelting Co., Ltd., Tokyo, Japan

[22] Filed: Sept. 6, 1972

[21] Appl. No.: 286,711

[30] Foreign Application Priority Data
Sept. 9, 1971 Japan.................................. 46/69976

[52] U.S. Cl.................................... 204/149, 210/44
[51] Int. Cl............................ C02c 5/12, C02b 1/82
[58] Field of Search...................... 210/44; 204/149, 204/152, 130, 131

[56] References Cited
UNITED STATES PATENTS

| | | | |
|---|---|---|---|
| 1,131,067 | 3/1915 | Landreth ............................ | 204/149 |
| 3,247,103 | 4/1966 | Shang ............................... | 204/130 X |
| 3,350,292 | 10/1967 | Weinberger et al. ............ | 204/149 X |
| 3,479,281 | 11/1969 | Kikindai et al. ................. | 204/149 X |
| 3,523,891 | 8/1970 | Mehl................................ | 204/149 X |
| 3,664,951 | 5/1972 | Armstrong............................ | 210/44 |

*Primary Examiner*—John H. Mack
*Assistant Examiner*—A. C. Prescott
*Attorney*—Woodhams et al.

[57] ABSTRACT

A method of separating metals contained in the waste water, which comprises the processes: the electrolysis of the waste water is conducted by adding an organic solvent and a nonionic surface active agent capable of emulsifying said organic solvent to the waste water containing such metals as Cd, Zn, Pb, Cu, Ni, Fe, Cr, Mn, Hg, Al, etc.; and the solid matters formed by the said electrolysis are made to float to be separated.

4 Claims, No Drawings

METHOD OF SEPARATING METALS FROM WASTE WATER

BACKGROUND OF THE INVENTION

*a. Field of the Invention*

The present invention relates to an improved method of treating the industrial waste water containing the ions of metals such as Cd, Zn, Pb, Cu, Ni, Fe, Cr, Mn, Hg, Al, etc. by electrolysis.

*b. Description of the Prior Art*

Among several means of treating the industrial water or industrial waste water containing the aforementioned metals in order to separate and remove such metals, the method of electrolysing them by employing the waste water as the electrolyte has become popular nowadays. According to this electrolytic method, aluminum is served as the anode, and this aluminum dissolves out of the anode by virtue of electrolysis and discharges electricity together with the metal ions existing in the waste water to thereby form a flock of hydroxides insoluble in water. And, this flock absorbs the gas generated at the cathode and comes to the surface of the liquid in the electrolytic cell. However, as is generally known, the flocks of hydroxides are extremely hydrophilic and apt to precipitate to suspend in the liquid, so that it has so far been very difficult to obtain a bottom liquid with high clearness by completely floating the flocks of these hydroxides.

SUMMARY OF THE INVENTION

Taking the actual circumstances as above into consideration, the inventors of the present invention have energetically continued their study on the electrolytic treatment of the waste water containing the metal ions, and as a result, they have come to the finding that the addition of an organic solvent together with a nonionic surface active agent necessary for emulsifying said organic solvent is very effective for improvement of the floatability of the flocks generated as above. The present invention has been achieved on the basis of this finding.

One object of the present invention is to provide a method of obtaining a bottom liquid (i.e., treated water) with high clearness through the process of electrolytically treating the waste water containing the metal ions to thereby separate said metals.

Another object of the present invention is to provide a method of electrolytically treating the waste water containing the metal ions, which renders the flocks hydrophobic and also improves the floatability of the flocks.

To be precise, the present invention relates to a method of eletrolytic purification of the waste water containing the ions of metals such as Cd, Zn, Pb, Cu, Ni, Fe, Cr, Mn, Hg, Al, etc., which is characterized by the process: conducting the electrolysis upon adding 1 − 50 g of an organic solvent per one m³ of the liquid (i.e., waste water) to undergo the electrolysis, together with a nonionic surface active agent necessary for emulsifying said organic solvent; and floating the solid matter made by the electrolysis in order to be separated.

DETAILED DESCRIPTION OF THE INVENTION

As stated above, according to the method of the present invention, the waste water containing Cd, Zn, Pb, other heavy metals and Al is served as the electrolyte, and, at the time of electroysis, an organic solvent to the extent of 1 − 50 g and a nonionic surface active agent to the extent of 0.5 − 50 g per 1m³ of this electrolyte are added.

The organic solvent applicable to the present method includes the petroleum solvents having a comparatively high boiling point and flash point, such as toluene, xylene, mineral spirit, solvent naphtha, etc. which may be applied either individually or upon combining two or more of them. The nonionic surface active agent to be added for the purpose of emulsifying said organic solvent includes polyoxyethylene alkyl ether, polyoxyethylene phenol ether, polyoxyethylene sorbitan fatty acid ester, polyoxyethylene acylester, sorbitan fatty acid ester, oxyethylene - oxypropylene block polymer, fatty acid monoglyceride, etc. which may be applied either individually or upon combining two or more of them. The quantity of said organic solvent to be employed depends on the kind and/or quantity of the metal contained in the waste water to be treated; generally speaking, however, it suffices to be in the range of 1 − 50 g per 1m³ of the waste water as set forth above. In case it is less than 1 g, the effect comes to be insufficient, while in case it is more than 50 g, the organic solvent cannot be disposed of in the course of the electrolysis and tends to remain in the treated liquid after electrolysis. Meanwhile, the quantity of the nonionic surface active agent to be employed suffices to be such a quantity as sufficient for emulsifying said organic solvent, and accordingly, the required quantity is almost equivalent to or less than that of the organic solvent, that is, 0.5 − 50 g or thereabout is appropriate.

On the occasion of adding the organic solvent to the waste water, it is necessary to form a perfect and stable emulsion. For this purpose, it will do to add the organic solvent and the surface active agent separately to the waste water, but it is preferable to prepare a mixture by adding the required quantity of the surface active agent to the organic solvent in advance, and then add this mixture to the waste water.

In this connection, a manufacture marketed under the name of 'Soluble Oil' and popular as an antifriction oil or a lubricant for use in machining is composed of said organic solvent and nonionic surface active agent. This substance, though its utilization as an additive for use in treating the waste water is unprecedented, can be employed as it is as the additive for the purpose of electrolytic treatment of the waste water containing metals according to the present invention.

As to the construction of the electrolytic cell for use in practicing the present electrolytic method, it will do either to construct it so as to be equipped with several sets of the vertical anode and cathode disposed face to face alternately as is generally known or to construct it so as to be equipped with the vertically suspended anodes and the horizontal cathodes disposed close to the bottom of the cell. At any rate, as the material for the anodes, it is desriable to employ aluminum. Employment of other materials, such as iron for instance, is admittedly also effective in purification of the waste water to some degree, but the result of a series of tests has proved that aluminum employed for the anode is preeminent above the rest for effecting said purification. On the contrary, as the material for the cathode, Cu, Ni, Fe and other known materials are applicable.

According to the present method as described above, the flock made by the electrolysis comes up to be accumulated in the upper part of the electrolytic cell or a solid separation tank provided for the process subsequent to the electrolysis to thereby form a layer of scum, and becomes hydrophobic by virtue of the aforesaid additives, namely, the organic solvent and nonionic surface active agent, whereby its floatability is remarkably improves, so that the flock once floated never reprecipitates or suspends even when subjected to strong agitation or left standing for many hours, and as a result, a purified waste water with an extremely high clearness can be obtained. Besides, by the action of said additives, the concentration of the solid matters in the layer of scum is by far higher than the concentration of the slurry to be obtained by the conventional separation method so that the filtration can be performed quite easily.

Moreover, contrary to the conventional settling agent coagulant, precipitant, and other additives which tend to remain in the purified waste water after the treatment to contribute to the increase in COD and/or BOD, the additive consisting of said organic solvent and nonionic surface active agent according to the present invention is completely absorbed in the flocks and never left in the purified waste water after the treatment.

DESCRIPTION OF THE PREFERRED EMBODIMENTS

Example 1

The waste water arising from Cd plating was subjected to cyan decomposition and Cr reduction to be followed by neutralization. Subsequently, to the thus obtained supernatant (which contained about 2.0 ppm of Cd and about 0.3 ppm of Cr) was added a mixture of the organic solvent and surface active agent as shown in the following Table (Result of Tests). By supplying the resulting emulsion to a 15$l$-electrolytic cell, provided with the anodes consisting of aluminum plates and having the total anode area of 14dm$^2$ and the cathodes consisting of iron plates and having the total cathode area of 3dm$^2$, from its upper end at the flux of 150 ml/min while discharging the purified waste water through the lower end of said electrolytic cell, electrolysis was conducted continuously by applying DC 1A.

The waste water coming out of the electrolytic cell after purification was subjected to sampling at regular intervals to analyze its Cd content and Al content, resulting in the showing in the following Table.

As is evident from this showing, the purified waste water obtained through electrolysis of the emulsion prepared by adding a mixture of the organic solvent and surface active agent to the raw waste water contained but a very small quantity of metals and showed a high clearness.

RESULT OF TESTS

| | Additive (gr./m.$^3$ of waste water) | | | | | |
|---|---|---|---|---|---|---|
| | Non-addition | | Solvent naphtha, 10; polyoxyethylene lauryl ether, 5 | | Water-soluble cutting fluid (manufactured by Johnson Co.), 45 | |
| Analytical value | Cd (p.p.m.) | Al (p.p.m.) | Cd (p.p.m.) | Al (p.p.m.) | Cd (p.p.m.) | Al (p.p.m.) |
| Number of days following the start of electrolysis: | | | | | | |
| 1 day | 0.2 | 38 | 0.02 | 6.0 | 0.01 | 5.7 |
| 2 days | 0.4 | 44 | 0.02 | 6.3 | 0.01 | 5.7 |
| 3 days | 0.1 | 52 | 0.02 | 6.8 | 0.01 | 5.7 |
| 4 days | 0.2 | 81 | 0.01 | 6.1 | 0.01 | 5.6 |
| 5 days | 0.2 | 80 | 0.01 | 6.1 | 0.01 | 5.8 |
| 6 days | 0.2 | 102 | 0.02 | 6.2 | 0.01 | 5.8 |
| 7 days | 0.2 | 97 | 0.01 | 6.2 | 0.02 | 5.8 |
| 8 days | 0.1 | 97 | 0.01 | 6.2 | 0.01 | 6.0 |
| 9 days | 0.25 | 99 | 0.01 | 6.3 | 0.01 | 5.8 |
| 10 days | 0.2 | 86 | 0.01 | 6.1 | 0.01 | 5.6 |

Example 2

When the same method as in Example 1 was applied to various waste waters containing the ions of heavy metals such as Zn, Pb, Ni, Fe, Cr, Mn, Hg, etc. respectively, it was possible to obtain a purified waste water containing but an extremely small quantity of heavy metal ions and having a high clearness, respectively.

What is claimed is:

1. A method of electrolytic purification of waste water containing metal ions comprising conducting electrolysis of the waste water after adding 1 to 50 grams of organic solvent per one m$^3$ of the waste water undergoing electrolysis, together with a nonionic surface active agent in an amount sufficient for emulsifying said organic solvent, and floating the solid matter produced by the electrolysis for separating same from the liquid.

2. A method as defined in claim 1, wherein said organic solvent is at least one member selected from the group consisting of toluene, xylene, mineral spirit and solvent naphtha.

3. A method as defined in claim 1, wherein the quantity of said nonionic surface active agent necessary for emulsifying said organic solvent is from 0.5 to 50 grams per one m$^3$ of the waste water to that of the organic solvent.

4. A method as defined in claim 1, wherein said nonionic surface active agent is at least one member selected from the group consisting of polyoxyethylene alkyl ether, polyoxyethylene phenol ether, polyoxyethylene sorbitan fatty acid ester, polyoxyethylene acylester, sorbitan fatty acid ester, oxyethylene-oxypropylene block polymer, and fatty acid monoglyceride.

* * * * *